US008689836B2

(12) United States Patent  (10) Patent No.: US 8,689,836 B2
Hudson  (45) Date of Patent: Apr. 8, 2014

(54) MARKING SYSTEM FOR A FLEXIBLE HOSE

(75) Inventor: Jeremy Hudson, Halifax (GB)

(73) Assignee: Aflex Hose Limited, Halifax, West Yorkshire (GB)

( * ) Notice: Subject to any disclaimer, the term of this patent is extended or adjusted under 35 U.S.C. 154(b) by 82 days.

(21) Appl. No.: 13/256,903

(22) PCT Filed: Dec. 9, 2009

(86) PCT No.: PCT/GB2009/051674
§ 371 (c)(1),
(2), (4) Date: Oct. 14, 2011

(87) PCT Pub. No.: WO2010/106302
PCT Pub. Date: Sep. 23, 2010

(65) Prior Publication Data
US 2012/0097284 A1   Apr. 26, 2012

(30) Foreign Application Priority Data

Mar. 17, 2009   (GB) .................................. 0904530.3
Sep. 4, 2009    (GB) .................................. 0915456.8

(51) Int. Cl.
*F16L 55/00*   (2006.01)
*B29C 65/00*   (2006.01)
*B32B 37/00*   (2006.01)
*B32B 38/04*   (2006.01)
*B32B 38/10*   (2006.01)

(52) U.S. Cl.
USPC ........... 138/104; 156/247; 156/249; 156/257; 156/268

(58) Field of Classification Search
USPC .................. 138/104, 132, 162; 428/220, 203; 156/247, 249, 257, 268, 296, 701
See application file for complete search history.

(56) References Cited

U.S. PATENT DOCUMENTS 4,205,750 A * 6/1980 Dews ............................ 206/534
4,604,155 A * 8/1986 McKiernan ................... 156/287
(Continued)

FOREIGN PATENT DOCUMENTS

DE   10328649 A1   1/2005
DE   10338338 A1   3/2005
(Continued)

OTHER PUBLICATIONS

Translation for DE10328649 attached.*
(Continued)

*Primary Examiner* — Paul R Durand
*Assistant Examiner* — Vishal Pancholi
(74) *Attorney, Agent, or Firm* — Howard & Howard Attorneys PLLC

(57) ABSTRACT

Apparatus and method for attaching an encapsulated marker to a flexible hose, such as a hose or cable. The method involves providing a flexible hose (100) having a rubber or plastic outer cover (202) positioned over an inner layer (203, 204). An annular segment of the outer cover is separated and removed to form an annular groove in the outer cover. A marker (101) is then positioned over the inner layer (203, 204) within the groove and a transparent encapsulating component (201) applied over the marker. A containment means (200) is then overlaid on the encapsulating component and overlaps onto a region of the outer cover either side of the groove. The cover assembly is then heated at elevated temperature. After cooling, the containment means (200) is removed. The encapsulated marker assembly is therefore provided which is chemically bonded or fused to the outer cover (202) of the flexible hose and is aligned flush with the external surface of the flexible hose.

26 Claims, 4 Drawing Sheets

(56) References Cited

U.S. PATENT DOCUMENTS

| | | | | |
|---|---|---|---|---|
| 4,898,703 | A | * | 2/1990 | Wells et al. .................... 264/166 |
| 5,062,456 | A | * | 11/1991 | Cooke et al. .................. 138/125 |
| 5,182,954 | A | * | 2/1993 | Menheere ................. 73/864.45 |
| 5,390,964 | A | * | 2/1995 | Gray, Jr. .......................... 285/93 |
| 5,402,592 | A | * | 4/1995 | Caveney et al. ................ 40/665 |
| 5,489,126 | A | * | 2/1996 | Gray, Jr. .......................... 285/93 |
| 5,494,374 | A | * | 2/1996 | Youngs et al. .................. 405/52 |
| 5,964,656 | A | * | 10/1999 | Lawler et al. ................. 452/173 |
| 6,147,160 | A | * | 11/2000 | Wang et al. .................... 525/106 |
| 6,308,741 | B1 | * | 10/2001 | Payne ........................... 138/110 |
| 6,503,619 | B1 | * | 1/2003 | Neal et al. ..................... 428/343 |
| 6,660,396 | B1 | | 12/2003 | Warburton-Pitt |
| 7,851,060 | B2 | | 12/2010 | Baker et al. |
| 2001/0029989 | A1 | * | 10/2001 | Paz .............................. 138/104 |
| 2003/0224183 | A1 | | 12/2003 | Warburton-Pitt |
| 2005/0133941 | A1 | | 6/2005 | Schuhmacher |
| 2005/0191454 | A1 | * | 9/2005 | Kaneko et al. ............. 428/36.91 |
| 2006/0057313 | A1 | * | 3/2006 | Moosheimer et al. ....... 428/34.1 |
| 2007/0026208 | A1 | | 2/2007 | Baker et al. |
| 2011/0023988 | A1 | * | 2/2011 | Ludwig et al. ................ 138/137 |
| 2013/0056538 | A1 | * | 3/2013 | Binmore ....................... 235/492 |

FOREIGN PATENT DOCUMENTS

| | | |
|---|---|---|
| DE | 202006007809 U1 | 7/2006 |
| EP | 1772657 A2 | 4/2007 |
| GB | 2442446 A | 4/2008 |
| WO | 2010106302 A1 | 9/2010 |

OTHER PUBLICATIONS

United Kingdom Search Report for application No. GB0904530.3, dated Jul. 17, 2009, 6 pages.

PCT International Search Report for International Application No. PCT/GB2009/051674, dated Mar. 19, 2010, 5 pages.

English language abstract for German Patent Application No. DE10328649A1, 1 page. Dated Jan. 13, 2005.

English language abstract for German Patent Application No. DE10338338A1, 1 page. Dated Mar. 24, 2005.

English language abstract for German Utility Model DE202006007809U1, 1 page. Dated Jul. 13, 2006.

English language abstract for European Patent Application No. EP1772657A2, 1 page. Dated Apr. 11, 2007.

* cited by examiner

MARKING SYSTEM FOR A FLEXIBLE HOSE

RELATED APPLICATIONS

The subject patent application claims priority to and all the benefits of International Patent Application No. PCT/GB2009/051674, filed on Dec. 9, 2009, which claims priority to Great Britain Patent Application Nos. GB 0904530.3, filed on Mar. 17, 2009 and GB 0915456.8, filed on Sep. 4, 2009, the disclosures of which is hereby incorporated by reference.

The present invention relates to an apparatus and method for attaching a marker to a flexible hose, and in particular, although not exclusively, to a system for attaching the marker so as not to provide a physical interface at the region of the hose where the marker is attached that would otherwise provide an entry and entrapment site for bacteria, dirt and the like.

Flexible hoses with smooth, easily cleaned external plastic or rubber covers are used extensively in the pharmaceutical, biotechnology and biomedical industries for the transport of fluids between equipment or vessels. It is often required to attach labelling to such hoses. First to identify the function of the hose, possibly in transferring a particular type of fluid, and secondly to identify the hose itself such as date of manufacture and manufacturing source with a view to maintaining or replacing the hose following extended use. In some cases, the label may include a colour code to indicate a particular item of information. In other cases, a Radio Frequency Identification (RFID) electronic 'tag', which incorporates the required information, and can be both read and re-programmed by a hand held Reader is used to label the hose.

Metal or plastic tags removably secured to the outer surface of the hose are disadvantageous as they can readily degrade, represent an obstruction and more importantly present 'entrapment regions' into which external dirt, organic matter or bacteria may become entrapped. The hose would then become difficult to clean, unhygienic and unsuitable for further use.

US 2003/0224183 discloses a system for permanently attaching a label to a manufactured product. A first silicone sheet material having a thermally activated cross linking catalyst, is secured to the product. The label is then placed on top of the silicone sheet and is then covered by a further piece of the same type of silicone sheet. Heat is then applied to the assembly to cause the silicone sheets to cross link thereby encapsulating the label and adhering the assembly to the underlying product.

US 2007/0026208 discloses a means of attaching a label to a piece of process equipment. A heat resistant printed label is applied to the outer surface of a silicone rubber covered hose. A narrow ribbon of durable transparent silicone rubber, being wide enough to overlap the edges of the label, is wrapped over the label. A transparent tape is then applied on top of the silicone cover, protecting the label. The whole assembly is then cured to chemically bond the tape, silicone cover and label to the product involving clamping the label assembly within a split mould which is then heated.

The above prior art provides a method for encapsulating a label, which is effectively sealed at the outside surface of the product. However, there are a number of disadvantages with these labelling systems.

In particular, if the edges of the encapsulating silicone component are momentarily lifted from the surface of the product, for example as may happen during manual cleaning or during severe flexing of a hose, the seal between the encapsulating component and the product will be broken presenting a crack or groove into which dirt, organic matter and bacteria may become entrapped.

A further disadvantage with conventional labelling systems is that the silicone rubber component is not aligned flush with the surface of the product. As such, the encapsulating component may be readily dislodged during use of the product, for example, if the product abuts against other pieces of equipment. The edge may therefore be caught with the possibility that the seal would be broken, again, leading to regions for entrapment.

The inventors therefore have realised a need for a labelling system that addresses the above problems.

Accordingly, the inventors provide an encapsulated identification marker system by which a marker is secured to a flexible hose, such that there is a seamless joint or substantially no physical interface provided between the encapsulating component and the external rubber or plastic cover of the flexible hose. Reference within this specification to the 'physical interface' includes a visually identifiable interface represented by opposed mating surfaces or points of contact between the external cover and the encapsulating component which would otherwise provide an entrapment site for dirt, organic matter and bacteria.

The invention also provides a means of attaching an encapsulated marker to a flexible hose such that the outer surface of the encapsulating component is aligned axially flush with the outer surface of the flexible hose such that the external profile of the flexible hose body is substantially uniform including the region where the marker is attached. That is, the cross sectional area and/or profile of the flexible hose at the region where the marker is not attached is substantially the same as the cross sectional shape and/or profile at the region where the marker is attached.

Reference within the specification to 'flexible hose' includes any hollow elongate flexible member, and in particular a hose where the flexible hose comprises a multilayered wall structure having an outer cover and at least one inner layer in particular a plurality of inner layers contained by the outer cover. In particular, the outer cover may be rubber or plastic (thermoplastic).

Reference within the specification to 'marker' includes a means of identifying the hose and includes a text label, a piece of colour coded material or an electronic tag, such as an RFID tag.

According to a first aspect of the present invention there is provided a method of attaching a marker to a flexible hose, the method comprising: providing a flexible hose having an outer cover positioned over an inner layer; separating and removing an annular segment of the outer cover from the flexible hose to form an annular groove in the outer cover; positioning a marker over the inner layer within the groove; applying a transparent encapsulating component over the marker; applying a containment means over the encapsulating component to cover an outer surface of the encapsulating component and a region of the outer cover of the flexible hose either side of the groove; heating the encapsulating component and the outer cover such that the mating surfaces of the encapsulating component and the outer cover chemically bond or fuse together to provide a substantially seamless joint; and removing the containment means from the outer surface of the encapsulating component and the outer cover wherein an outer surface of the encapsulating component is aligned axially substantially flush with an external surface of the outer cover of the flexible hose after the step of heating the encapsulating component.

Optionally, the method further comprises making two circumferential cuts in the outer cover to define the region of the groove, making one longitudinal cut between them, then peeling off that section of the cover to provide the annular groove.

Optionally, the method further comprises radially compressing the encapsulating component within the groove.

Optionally, the method further comprises increasing the pressure about the flexible hose, containment means and encapsulating component above atmospheric pressure during heating of the assembly. This may be achieved by pressurising the flexible hose in an autoclave or other suitable pressurisable container.

Preferably, the method further comprises heat treating the encapsulating component so that the outer edges of the encapsulating component thermally expand and intimately compress against the opposed inner edge surfaces of the groove in the outer cover that, in part, defines the groove, such that the two compressed surfaces chemically bond or fuse together during the curing process.

Preferably, the encapsulating component is chemically bonded or fused to the outer cover after heating of the encapsulating component wherein there is substantially no physical interface defined by the opposed mating surfaces of the encapsulating component and the outer cover.

Optionally, the marker may comprise a text label, a coloured piece of material or a material that has coloured regions to provide a colour code; or an electronic chip or tag. Where the present invention involves attaching an electronic tag to a flexible hose the method further comprises positioning a first encapsulating component over the inner layer within the groove; positioning the electronic tag over the first encapsulating component and applying a second transparent encapsulating component over the tag followed by the steps of applying the containment means and subsequent heating step.

Preferably, where the flexible hose comprises an outer cover of silicone rubber, the encapsulating component comprises a transparent silicone rubber. Preferably, for hoses with an outer cover of ethylenepropylenediene (EPDM) rubber, the encapsulating component comprises a transparent EPDM rubber.

Preferably, for any other type of rubber where it is possible to provide a transparent grade, the cover and encapsulating component both comprise the same type of rubber, so as to enable welding via chemical bonding.

Preferably, the containment means comprises a polyester film wrap. Alternatively, the containment means may comprise a split mould, such as a steel mould that may be clamped over the external surface of the flexible hose and marker assembly to hold the marker assembly in position during heating. The split mould is therefore capable of being heated and designed to effectively transfer heat to the underlying outer cover of the flexible hose and the encapsulating component.

According to a second aspect of the present invention, there is provided a flexible hose comprising: a protective outer cover having an external surface and an internal facing surface; an inner layer positioned under the outer cover and against the internal facing surface; a marker positioned over a region of an external facing surface of the inner layer; a transparent encapsulating component positioned over the marker; wherein the encapsulating component is chemically bonded or fused to the outer cover at annular regions between the external surface and internal facing surface of the outer cover to provide a seamless joint; and wherein an outer surface of the encapsulating component is aligned axially substantially flush with an external surface of the outer cover of the flexible hose.

Additionally, the outer cover may comprise a rubber and a wire braid layer positioned under the outer rubber cover. Preferably, the hose may further comprise an inner hose liner positioned under the wire braid.

A specific implementation of the present invention will now be described, by way of example only and with reference to the accompanying drawings in which.

Figure 1:
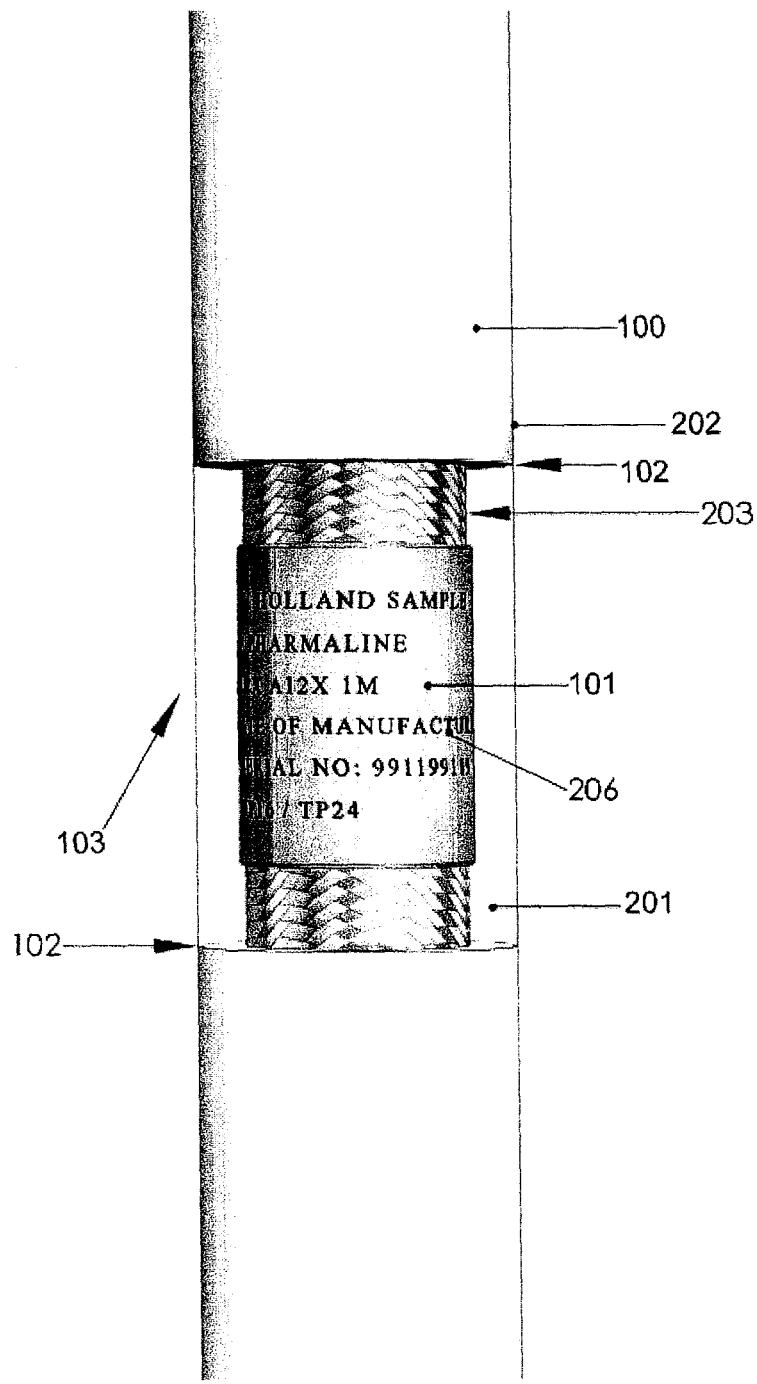
FIG. 1 is a perspective view of a hose comprising a marker assembly according to one aspect of the present invention.
Figure 2:
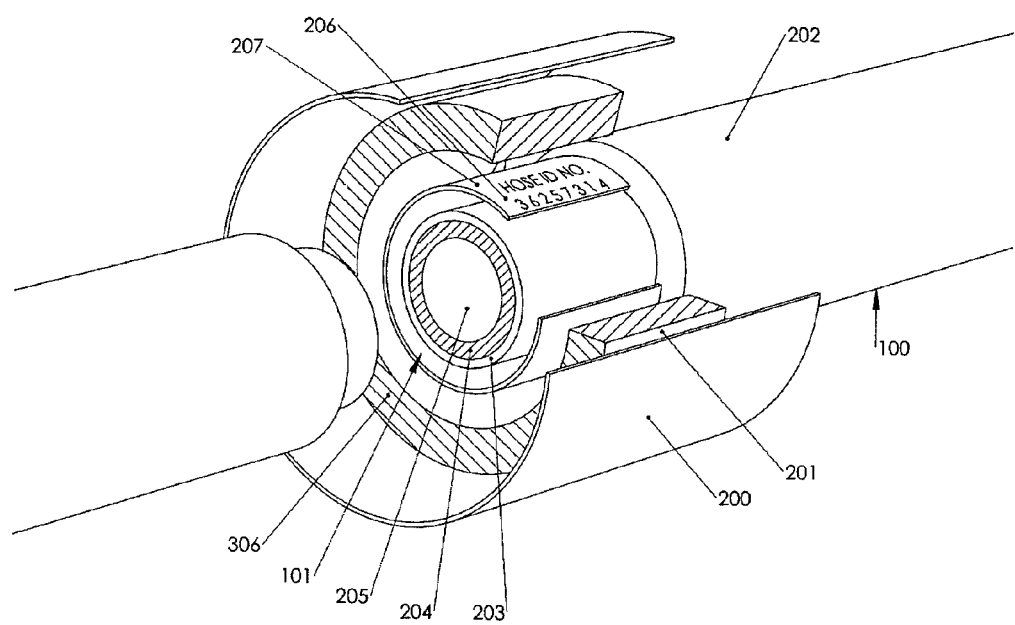
FIG. 2 illustrates an exploded perspective view of the marker assembly to be assembled over a hose according to the specific implementation of FIG. 1.

Referring to FIGS. 1 and 2, a flexible hose 100 comprises an external cured silicone rubber cover 202 extending along the length of the hose. Rubber cover 202 overlays an intermediate steel wire braid 203 that encloses an inner polytetrafluorethylene (PTFE) tube hose liner 204.

The marker assembly comprises a text label 101 having indicia 206 provided on an external facing surface 207. A transparent rubber encapsulating component 201 comprises a thickness approximately corresponding to the thickness of the external rubber cover 202 of hose 100. Encapsulating component 201 is capable of being positioned over and about label 101, the width of label 101 being equal to or less than the width of component 201, and the width of component 201 being approximately equal to the width of the annular groove in the rubber cover. According to the specific implementation, component 201 comprises transparent silicone rubber. A thin containment wrap 200, in the form of a polyester film, is wound on so as to cover a width being greater than cover 201 and label 101 and is designed for positioning over and about component 201 when assembled at hose 100.

Label 101 and encapsulating component 201, as an assembly and when heated, and cured in position, are configured to form a composite section 103 of the elongate hose 100. In particular, when cured in position and chemically bonded to the outer cover 202 of hose 100, the interfaces 102 between component 201 and outer cover 202 is devoid of any gaps or cracks as the opposed mating surfaces of component 201 and cover 202 are pressed together and chemically bonded during the heating and curing process. This provides a seamless flexible coupling joint to completely seal label 101 in position as an inner layer part of hose 100.

Figure 3:
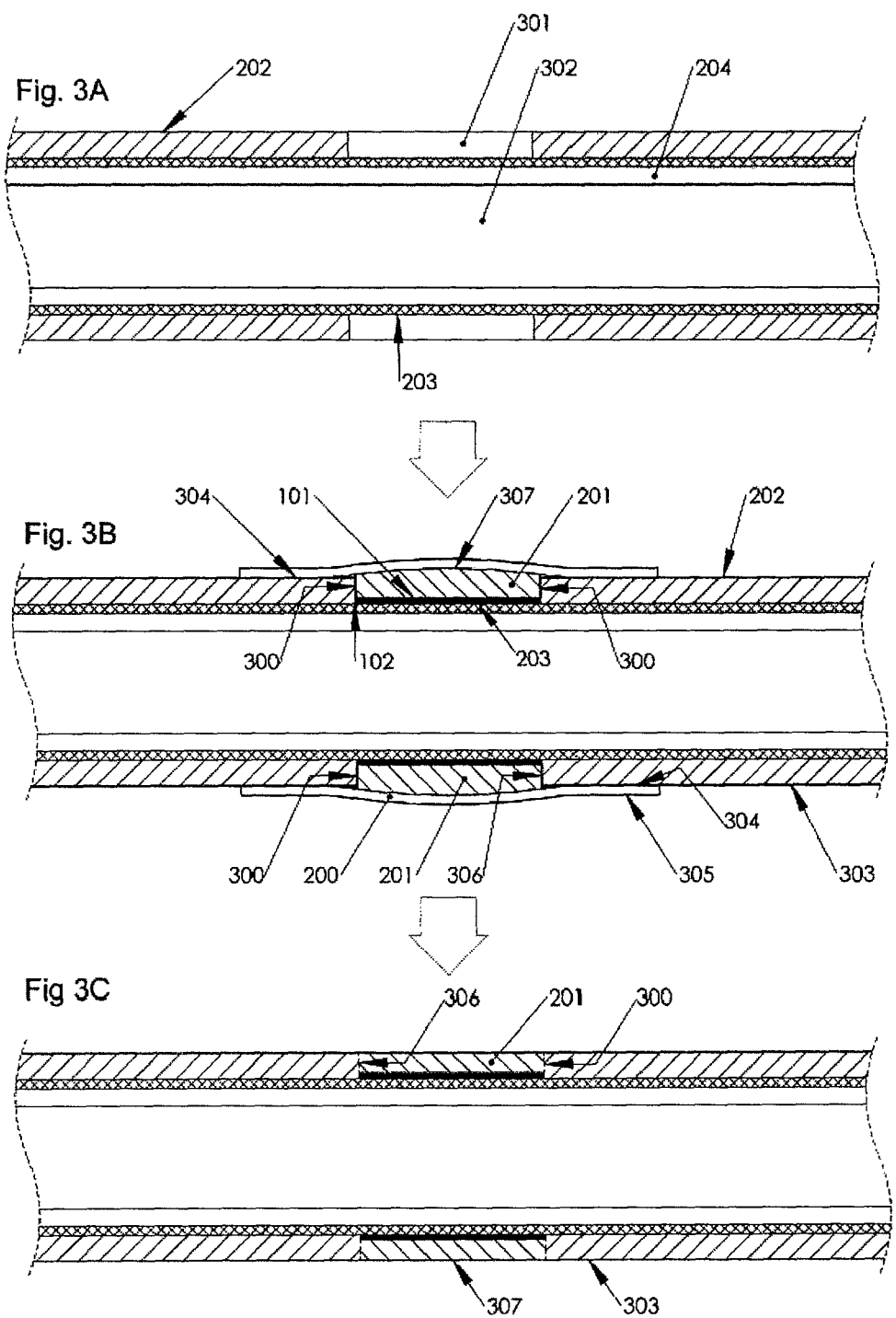
FIG. 3A is a cross sectional side elevation view of a hose having an annular segment of an outer cured rubber cover removed.
FIG. 3B is a cross sectional side elevation view of the hose of FIG. 3A including a marker, an uncured, transparent rubber encapsulating component and a polyester containment wrap prior to a step of heating the assembly.
FIG. 3C illustrate the marker assembly of FIG. 3B bonded in place at the outer edges of the encapsulating component to the cover of the hose of FIG. 3B.

FIGS. 3A to 3C illustrate the attachment process by which marker 101 is sealed in position at hose 100. In a first stage referring to FIG. 3A, an annular segment 301, corresponding approximately to the dimensions, profile and shape of component 201, is removed from outer cover 202 of hose 100 to form an annular groove in cover 202. The cutting of the annular segment is achieved by a suitable cutting means (not shown). Annular groove 301 is defined, in part, by i) the opposed end surfaces 300 of outer cover 202 exposed by the removal of the annular segment and ii) the exposed external facing surface of the underlying metal braid layer 203.

According to a second attachment stage, referring to FIG. 3B, marker 101 is applied in position. Firstly, marker 101 is overlaid on top of the external facing surface of wire braid layer 203. The component 201 is then overlaid on top of marker 101 such that the outer edges of component 201 are positioned and abut against the exposed and opposed inner surfaces 300 of cover 202 that define annular groove 301.

The component 201 is then radially compressed to ensure that the exposed surfaces 300 are completely covered by the component 201.

As a final step of the second attachment stage, referring to FIG. 3B, a polyester film wrap 200 is then applied tightly over the component 201. As the width of the wrap 200 is greater than the width of groove 301 and component 201, a portion 305 of wrap 200 extends onto the outer surface 303 of cover 202 at regions 304 immediately adjacent to defining edges 300 of groove 301. That is, wrap 200 is configured to overlap both component 201 and regions 304 of outer cover 202, providing a complete containment for the marker assembly In a final attachment stage, referring to FIG. 3C, the entire hose assembly is heated and the component cured. Heating component 201 at the required temperature provides vulcanisation (curing) of the rubber and thermal expansion pressure within the contained component, which acts in an axial direction. The heating also provides the chemical bonding via cross-linking the opposed surfaces of component and cover, now pressed together, in the axial direction, by thermal expansion within the contained region.

Following the curing process, the outer wrap 200 is removed from positioning over and about component 201 and outer cover 202. The result is a chemically bonded marker assembly 201 having an outer surface 307 that is aligned axially flush with the external surface 303 of the outer cover 202. Marker 101 is completely sealed by the bonding between edges 306 and exposed surfaces 300. Accordingly, the present marker assembly via the attachment method does not present potential entrapment regions that may be created during use of the hose. In particular, extended flexing and tensile testing trials have concluded that a sufficiently strong chemical bond is achieved between curable cover 201 and outer cover 202 such that bond failure at the interface between surfaces 306 and 300 does not occur in service. Also, as the outer surface 307 of the marker assembly is aligned flush with the outer surface 303 of hose 100, a transparent flexible marker cover is provided that sits axially flush with the flexible hose and does not provide entrapment regions. Furthermore, the present assembly does not have any unbonded surfaces that are pressed together which might otherwise provide potential entrapment sites.

Figure 4:
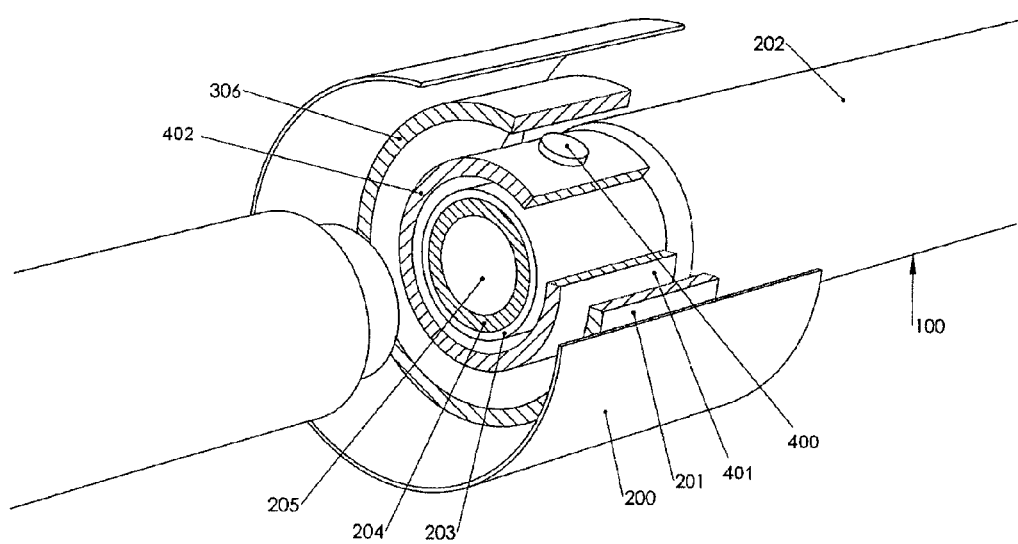
FIG. 4 illustrates a further specific implementation of the subject invention in which an RFID tag is attached to the flexible hose.

FIG. 4 illustrates a further embodiment of the present invention in which an electronic tag (RFID tag 400) is attached to flexible hose 202. According to this further embodiment, a first encapsulating component 401 is positioned over the wire braid layer 203 which encloses the inner liner 204. RFID tag 400 is then positioned on top of encapsulating component 401. A second encapsulating component 201 is then applied over the first encapsulating component 401 such that the RFID tag 400 is sandwiched between the first and second encapsulating components 201, 401. The RFID tag and flex arrangement of FIG. 4 is then processed according to the attachment steps illustrated in FIGS. 3A to 3C. Accordingly, RFID tag 400 is completely sealed between the encapsulating components 201, 401 by the bonding between perspective edges 402, 306 and exposed surfaces 300 (referring to FIGS. 3A to 3C) of the outer cover 202. According to the embodiment of FIG. 4, the first encapsulating component 402, positioned under RFID tag 400 provides an electrically insulating barrier layer between wire braid 203 and the electronic tag 400. A thickness of the first and second encapsulating component layers 202, 401 may be the same or may be different.

The invention claimed is:

1. A method of attaching a marker to a flexible hose, the method comprising:
   providing a flexible hose having a cured or vulcanised outer cover positioned over an inner layer;
   separating and removing an annular segment of the outer cover from the flexible hose to form an annular groove in the outer cover extending from an external surface of the outer cover to an external facing surface of the inner layer;
   positioning a marker over the external facing surface of the inner layer within the groove;
   applying an uncured or unvulcanised transparent encapsulating component over the marker;
   applying a containment means over the encapsulating component to cover an outer surface of the encapsulating component and a region of the outer cover of the flexible hose either side of the groove;
   heating the uncured or unvulcanised encapsulating component and the cured or vulcanised outer cover such that the mating surfaces of the encapsulating component and the outer cover chemically bond or fuse together to provide a substantially seamless joint; and
   removing the containment means from the outer surface of the encapsulating component and the outer cover;
   wherein an outer surface of the encapsulating component is aligned axially substantially flush with an external surface of the outer cover of the flexible hose after the step of heating the encapsulating component.

2. The method as claimed in claim 1 further comprising making two circumferential cuts in the outer cover to define the region of the groove extending from the external surface of the outer cover to the external facing surface of the inner layer.

3. The method as claimed in claim 1 further comprising radially compressing the encapsulating component within the groove.

4. The method as claimed in claim 1 further comprising applying an external radial pressure to the containment means and the encapsulating component during the heating of the encapsulating component and the outer cover.

5. The method as claimed in claim 4 comprising increasing the pressure about the hose, containment means and encapsulating component above atmospheric pressure during the heating step.

6. The method as claimed in claim 5 comprising pressurising the flexible hose in an autoclave.

7. The method as claimed in claim 5 comprising pressurising the flexible hose in a pressurisable container.

8. The method as claimed in claim 1 comprising heating a rubber encapsulating component so that the outer edges of the rubber encapsulating component bond chemically to the opposed inner edges of a rubber outer cover that, in part, define the groove.

9. The method as claimed in claim 1 further comprising heating a thermoplastic encapsulating component so that the outer edges of the encapsulating component and the opposed inner edges of a thermoplastic outer cover that, in part, defines the groove melt and fuse together.

10. The method as claimed in claim 8 wherein after heating of the encapsulating component there is no physical interface defined by the opposed mating surfaces of the encapsulating component and the outer cover.

11. The method as claimed in claim 1 further comprising:
    positioning a first encapsulating component over the inner layer within the groove;
    positioning an electronic tag over the first encapsulating component; and
    applying a second transparent encapsulating component over the tag prior to the step of applying the containment means and heating the encapsulating component.

12. The method as claimed in claim 8 wherein the encapsulating component comprises a substantially transparent curable rubber which is capable of bonding to the rubber outer cover during the heating process.

13. The method as claimed in claim 8 wherein the outer cover comprises silicone rubber, and the encapsulating component comprises a substantially transparent silicone rubber.

14. The method as claimed in claim 8 wherein the outer cover comprises EPDM rubber and the encapsulating component comprises a substantially transparent EPDM rubber.

15. The method as claimed in claim 10 wherein the outer cover comprises a thermoplastic material and the encapsulating component comprises a substantially transparent thermoplastic material.

16. The method as claimed in claim 1 wherein the containment means comprises a polyester film wrap.

17. The method as claimed in claim 1 wherein the containment means comprises a split mould, which can be heated.

18. A flexible hose comprising:
    a cured or vulcanised protective outer cover having an external surface and an internal facing surface;
    an inner layer positioned under the outer cover and against the internal facing surface;
    a marker positioned over a region of an external facing surface of the inner layer, the outer cover having been completely removed from the region;
    a transparent encapsulating component positioned over the marker and cured or vulcanised in position over the marker;
    wherein the encapsulating component is chemically bonded or fused to the outer cover at annular regions between the external surface and internal facing surface of the outer cover to provide a substantially seamless joint; and
    wherein an outer surface of the encapsulating component is aligned axially substantially flush with an external surface of the outer cover of the flexible hose.

19. The flexible hose as claimed in claim 18 comprising a seamless interface between the encapsulating component and the outer cover such that there is no physical interface defined by opposed mating surfaces of the encapsulating component and the outer cover.

20. The hose as claimed in claim 18 wherein the marker comprises a text label.

21. The hose as claimed in claim 18 wherein the marker comprises a colour code.

22. The hose as claimed in claim 18 wherein the marker comprises an electronic ID tag.

23. The hose as claimed in claim 18 wherein the marker comprises an electronic RFID tag.

24. The flexible hose as claimed in claim 18 wherein the encapsulating component comprises a transparent silicone rubber.

25. The flexible hose as claimed in claim 18 wherein the encapsulating component comprises substantially transparent EPDM rubber.

26. The method as claimed in claim 9 wherein after heating of the encapsulating component there is no physical interface defined by the opposed mating surfaces of the encapsulating component and the outer cover.

\* \* \* \* \*